United States Patent Office 3,721,098
Patented Mar. 20, 1973

3,721,098
COOLING BY MIXING GASEOUS STREAMS
Wolfgang Forg, Grunwald, and Peter Dupont, Munich, Germany, assignors to Linde Aktiengesellschaft Zentrale Patentabteilung, Hollriegelskreuth, Germany
Filed Dec. 18, 1969, Ser. No. 886,246
Claims priority, application Germany, Dec. 18, 1968, P 18 15 532.3
Int. Cl. F25j *1/00, 3/03, 3/06*
U.S. Cl. 62—17         8 Claims

ABSTRACT OF THE DISCLOSURE

In a process for the production of ammonia synthesis gas comprising the steps of cooling nitrogen and raw hydrogen in heat exchange with scrubbing column products; scrubbing the raw hydrogen in a column countercurrently to liquid nitrogen; and admixing cooled nitrogen to purified hydrogen gas leaving the column, in an amount required to establish a hydrogen:nitrogen ratio of 3:1; the improvement comprising compressing said nitrogen, prior to said cooling, to a higher pressure not substantially above 10% of the pressure of resultant scrubbed hydrogen gas, said higher pressure being sufficient to admix resultant cooled nitrogen to said scrubbed hydrogen. In addition, because lower pressures can be utilized for obtaining the necessary make-up refrigeration, the same turbocompressor employed for compressing nitrogen cycle gas is employed for compressing the nitrogen to be fed to the scrubbing column.

---

This invention relates to systems for producing refrigeration, and in particular to such systems applied to the low temperature separation of gases, e.g. the production of ammonia synthesis gas. Processes known heretofore for the production of refrigeration are based on the fact that a compressed gas below the Joule-Thomson inversion temperature is cooled during expansion. This expansion is conducted either in a throttle valve or in an engine producing external work, e.g. a turbine. Thus, it is necessary to compress the gas to be cooled to a pressure substantially above that pressure at which the cooled gas or the fractionation products thereof are later available. In the case of engine expansion, there is the added investment and maintenance costs for providing an expansion machine in the low temperature section. These disadvantages become acute when only a low refrigeration output is required, i.e., for example, in a low temperature separation process wherein only the insulation losses of the plant and the heat exchange losses are to be compensated for.

It is thus one object of this invention to provide a process for the production of refrigeration, particularly for low outputs per Nm.³, involving both low investment and operating costs.

This objective is attained by first cooling two gaseous streams. The major components of the first stream must have substantially higher boiling temperatures than those of the major components of the second stream under substantially the same pressure which must be higher than the highest of the critical pressures of the major components. The cooling is conducted to a temperature below the highest of the critical temperatures of the major components. The refrigeration is then obtained by mixing these two gaseous streams.

The pressure upstream of the mixing valve need only be higher than the pressure downstream of the mixing valve by the value of the pressure differential necessary to compensate for the frictional pressure drop of this valve. Therefore, the upstream pressure of one gaseous stream generally does not exceed the downstream pressure of the mixture by more than 30, preferably not more than 10%.

Without being bound by an explanation of the underlying mechanism of the invention, it is possible to produce refrigeration not only by throttle expanding a gas to a substantially lower pressure, but also by mixing a gas, at a sufficiently high pressure, with another gas, i.e. by expanding the former gas, with the pressure of the system remaining the same, to its partial pressure in the mixture. The only prerequisite for this effect to occur to an appreciable extent is that the boiling points of the main components of each of the gaseous streams to be mixed—based on equal pressure—are spaced sufficiently far apart, i.e. that the major portion of one gaseous stream boils at atmospheric pressure on the average of at least 33° C., preferably at least 57° C. lower than the major portion of the other gaseous stream. For example, one gaseous stream preferably comprises a major portion of hydrogen or helium, and the other gaseous stream comprises a major portion of nitrogen, argon, carbon monoxide, methane, ethylene, or ethane. Each of the two gaseous streams can also be a mixture, as long as one of the streams contains a major portion of one or more of the higher-boiling components, and the other gaseous stream contains a major portion of one or more of the lower-boiling components.

Advantages of the process of this invention are that none of the two gaseous streams suffers a substantial pressure loss, and that no moving parts are required in the low-temperature section of the plans, except for control valves.

A particularly preferred field of utilization of the invention is in the production of a hydrogen-nitrogen ammonia synthesis gas mixture subsequent to the liquid nitrogen scrubbing step. Since the ammonia synthesis is conducted at pressures on the order of magnitude of 200 atmospheres, it is desirable to maintain the pressure level at which the hydrogen is produced as much as possible during the subsequent purification steps. For this reason, it is becoming more frequent for the liquid nitrogen scrubbing step to be conducted under elevated pressure.

Depending on which of the conventional processes for the production of refrigeration is preferred, essentially two different processes can be used for the production of synthesis gas: In one process, the scrubbing nitrogen is liquefied under a relatively low pressure and then compressed to the scrubbing pressure by means of a pump; the cold losses are compensated for by engine expansion of the synthesis gas or of a partial nitrogen stream (see, for example, U.S. Pat. 3,312,075). The second possibility comprises compressing the gaseous nitrogen to about 200 atmospheres, cooling the nitrogen, and expanding the same to the considerably lower scrubbing pressure, during which procedure the nitrogen enters the liquid phase (cf., for example, "Linde—Berichte aus Technik und Wissenschaft" [Linde—Reports on Science and Technology], No. 4/1958, pp. 27–28).

Both processes suffer from the disadvantages typical for the respective type of refrigeration production. The first-mentioned process requires liquid pumps and expansion machines in the low-temperature section. In the second process, the pressure loss of the nitrogen is considerable; this not only involves increased costs for installing and operating the compressor, but also two different heat exchange paths must be provided, namely one for the heat exchange with the high-pressure nitrogen and one for the heat exchange with the raw hydrogen which is under a lower pressure.

Accordingly, a further object of this invention resides in providing a process for the production of ammonia synthesis gas by cooling nitrogen and raw hydrogen in heat exchange with fractionation products; treating the raw hydrogen in a column countercurrently to liquid nitrogen; and admixing cooled nitrogen to the purified gas leaving the column, in an amount necessary to obtain a hydrogen:nitrogen ratio of 3:1, which process can be conducted in simplified apparatus and with significant savings in energy.

This object is accomplished, according to this invention, by feeding the raw hydrogen to the low-temperature section at a pressure of at least 35 atmospheres, preferably about 45–85 atmospheres, the highest possible pressure being about 180 atmospheres (all atmospheres being absolute unless otherwise indicated) and compressing the nitrogen, prior to entering the low-temperature section, to a pressure not substantially higher than the pressure of the purified hydrogen, but sufficient to admix the cooled nitrogen to the hydrogen, the pressure differential being preferably in the range of 0.1 to 5 atmospheres. The refrigeration gained in this manner is sufficient to compensate for the refrigeration losses of the plant.

As compared to conventional processes utilizing engine expansion of the synthesis gas or of the nitrogen, the advantages of the present process include not only the lack of moving parts in the low-temperature section (except for control valves), but also the absence of any appreciable pressure loss in the raw hydrogen or nitrogen streams. A comparison with the process operating with high-pressure nitrogen, utilizing the Joule-Thomson effect of the nitrogen for recovering refrigeration losses, demonstrates that in the present invention it is unnecessary to compress the nitrogen to a substantially higher pressure than the scrubbing pressure, i.e. that the resultant gaseous mixtures, except for the pressure loss in the low-temperature section, are available at about the same pressure at which the raw hydrogen and the nitrogen have been introduced into the plant.

The process of the present invention for the production of ammonia synthesis gas is preferably conducted at a pressure of not more than 250 atmospheres, particularly not more than 180 atmospheres. At pressures of more than 180 atm., a gaseous phase at the head of the column with 75% $H_2$ and 25% $N_2$ can exist in equilibrium with the liquid phase only when the temperature at the head of the scrubbing column is below the boiling temperature of the nitrogen at atmospheric pressure, i.e., the required low temperature at the head of the scrubbing column can be attained, for example, by nitrogen evaporating under a vacuum. In case the scrubbing column is to be operated under still higher pressures, the head temperature thereof must be still further lowered. The absolute upper pressure limit for practical purposes is where the desired composition of the gaseous phase can be reached only at temperatures below the freezing point of nitrogen.

The raw hydrogen for the ammonia synthesis gas can be produced by the partial oxidation of hydrocarbons. Oxygen required for this purpose is obtained from an air separation plant, which plant also supplies the nitrogen required for the liquid nitrogen scrubbing step as well as that required for the desired $H_2$:$N_2$ ratio. Since, as mentioned above, it is desired to increase the pressure of the hydrogen production, the oxygen must likewise be made available under an elevated pressure. However, in order to compress gaseous oxygen, there is required complex machinery including a final stage reciprocating compressor, the latter being a potential explosion hazard. It is generally preferred, therefore, to bring the liquid oxygen obtained in the air rectification stage to the desired final pressure by means of a pump, and only thereafter, is the oxygen heated.

The compressed oxygen, however, can transfer its refrigeration values only to a gas, the heat capacity of which exhibits a comparable value; the air which is compressed to only 5–6 atm. cannot be utilized for this purpose. For this reason, the air separation plant must be equipped with a nitrogen cycle having a sufficiently high final pressure so that it can be heat exchanged with the cold, compressed oxygen, to absorb the refrigeration values thereof. Thus, the cycle pressure must be approximately as high as the final pressure of the oxygen. Furthermore, by the ensuing expansion, the cycle nitrogen yields at least part of the refrigeration necessary for the air separation.

For conventional size plants, the amount of nitrogen required for operating the nitrogen scrubbing stage is not so large as to make it practicable to employ a turbo-compressor. Furthermore, in those processes relating to liquid nitrogen scrubbing wherein nitrogen is compressed in the gaseous phase, cooled, and then expanded to the scrubbing pressure, the required final pressure of the nitrogen compressor is considerably above the final pressure of the nitrogen cycle compressor of the air separation plant. Consequently, the nitrogen for the liquid nitrogen scrubbing stage had to be compressed, at least in the final stages, in high-pressure reciprocating compressors.

Thus, a still further object of this invention is to provide a system which permits a reduction in investment and operating costs relating to nitrogen compression, in a process for the production of ammonia synthesis gas from raw hydrogen wherein the nitrogen for the liquid nitrogen scrubbing stage and for obtaining the desired $H_2$:$N_2$ ratio is withdrawn from an air separation plant, and wherein oxygen compressed in the liquid phase is warmed by heat exchange with compressed cycle nitrogen.

This object is attained by compressing the nitrogen required for the liquid nitrogen scrubbing step and for setting the desired hydrogen:nitrogen ratio by means of the cycle compressor of the air separation plant, and by employing turbocompressor means as said cycle compressor.

Thus, the cycle nitrogen of the air separation plant and the nitrogen required for the production of the synthesis gas are compressed in the same machine. This is possible due to the fact that the nitrogen for the synthesis gas production, in the gaseous phase, need not be compressed, according to the invention, to pressures of about 200 atm. Instead, the nitrogen is compressed only to the pressure of the hydrogen production stage, insofar as the latter exceeds 55 atm., i.e., to a pressure in the same range as the delivery pressure of the oxygen produced by the air separation plant, the pressure of the nitrogen being about 35 to 180 atmospheres, and that of the oxygen being about 35 to 180 atmospheres.

The process of this invention affords still another advantageous system for combining the synthesis gas production plant with the air separation plant. The peak cold required for initiating the liquid nitrogen scrubbing step is supplied by liquid nitrogen from the air separation plant. In this connection, liquid nitrogen is withdrawn from the high pressure column of the air separation plant, expanded to little more than atmospheric pressure, e.g.

(1.1 to 2 atmospheres) and fed to the last heat exchanger wherein the raw hydrogen and the nitrogen are heat exchanged therewith on their way to the liquid nitrogen scrubbing column. The resultant evaporated nitrogen is discharged to the outside together with the nitrogen withdrawn from the head of the low-pressure column of the double column via the heat exchangers of the air separation plant.

The apparatus for conducting the process for the production of ammonia synthesis gas according to the invention is characterized by conduits for compressed raw hydrogen, somewhat higher-compressed nitrogen, synthesis gas, and residual gas; by heat exchangers for cooling raw hydrogen and nitrogen in countercurrent relation to synthesis gas and residual gas; by a nitrogen scrubbing column having a lower inlet point for the cold end of the raw hydrogen conduit, an outlet for residual gas in the sump in communication via at least one expansion valve with the cold end of the residual gas conduit, a connection point for the cold end of the synthesis gas conduit in the head, as well as having an inlet for feeding liquid nitrogen into the head; and by two conduits communicating with the cold end of the nitrogen conduit, which two conduits are connected, each by an expansion valve, with the inlet conduit for feeding liquid nitrogen and with the synthesis gas outlet conduit in the nitrogen scrubbing column, respectively.

Upon further study of the specification, other objects and advantages of the invention will become apparent.

DETAILED DESCRIPTION OF THE DRAWINGS

In the following description, the quantities are set forth by way of example and are not to be considered limitative of the invention.

Figure 1:
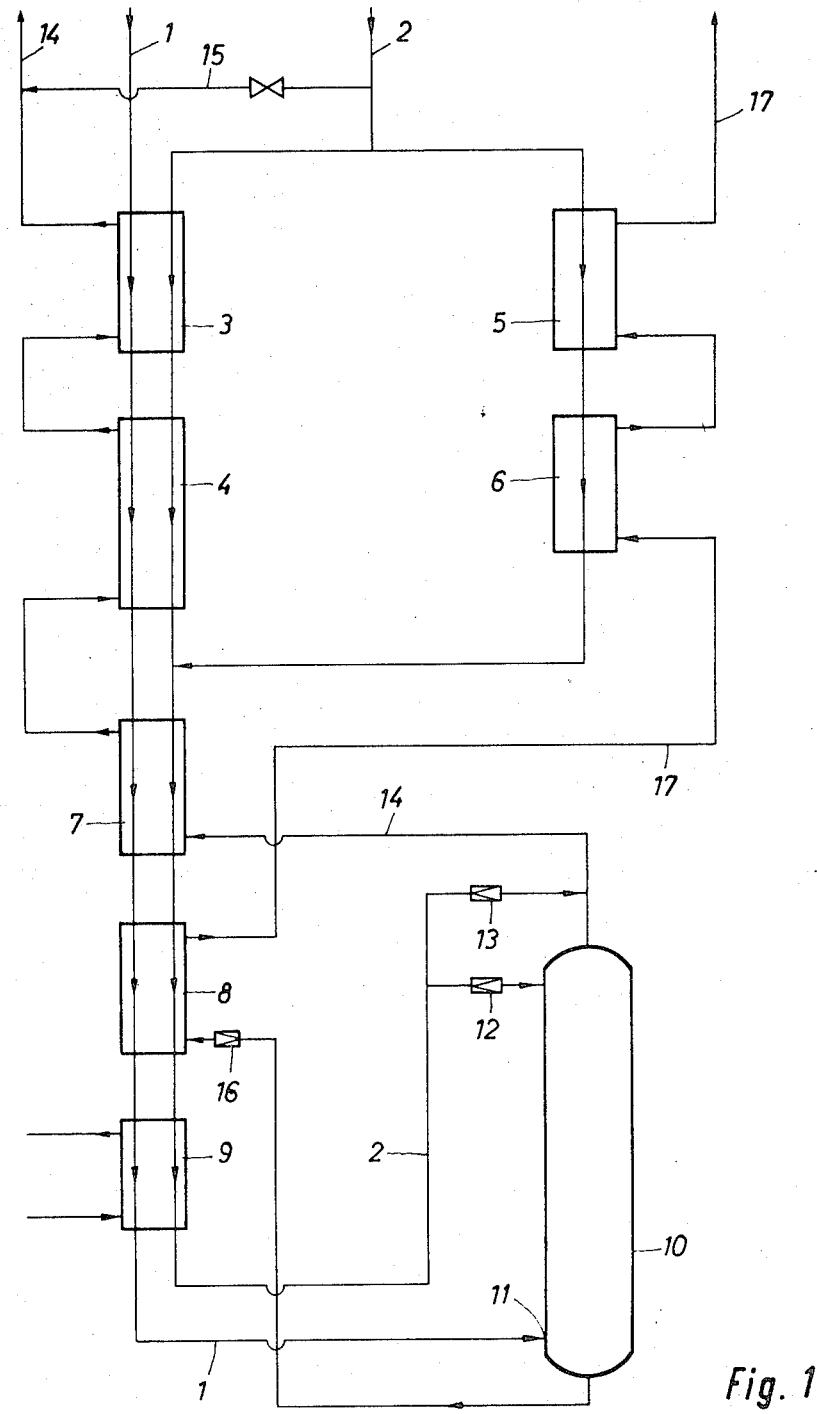
FIG. 1 is a schematic flowsheet depicting a preferred embodiment of the invention, as applied to the production of ammonia synthesis gas wherein the mixing of nitrogen and hydrogen produces the necessary make-up refrigeration losses of the plant.

Referring to FIG. 1, the raw hydrogen enters the plant through conduit 1 at a pressure of about 73 atmospheres and at ambient temperature. A partial stream of nitrogen compressed to 80 atmospheres enters through conduit 2. Both the hydrogen and nitrogen streams are cooled in separate conduits in heat exchangers 3 and 4 countercurrently to synthesis gas, whereas the remaining nitrogen is passed in heat exchangers 5 and 6 countercurrently to expanded residual fluid. The two nitrogen streams are combined and pass, together with the raw hydrogen, through the heat exchangers 7, 8, and 9. In the heat exchanger 7, the cooling medium is synthesis gas, but in heat exchanger 8, the cooling medium is expanded residual gas from the sump of the nitrogen scrubbing column 10. The heat exchanger 9 is cooled only when the plant is placed on stream, namely with liquid nitrogen from a source located externally of the plant.

The raw cooled hydrogen is fed at inlet 11 into the scrubbing column 10, operating at about 73 atmospheres and having a temperature of 83° K. Part of the cooled nitrogen is fed, via expansion valve 12, to the head of column 10. Since the critical pressure of the hydrogen-nitrogen mixture is substantially higher than both the critical pressures of the main components and the column pressure, the nitrogen, when mixed with $H_2$, passes into the liquid phase, thus forming the scrubbing fluid necessary for the removal of CO and $CH_4$. The remainder of the nitrogen, namely the amount necessary for obtaining the synthesis ratio of $3H_2:1N_2$, is admixed, through the mixing valve 13, to the purified mixture of about 89.5 molar percent hydrogen with 10.5 molar percent nitrogen which leaves the head of the column 10 at about 83° K. Thus, nitrogen of about 80 atmospheres is combined with the purified hydrogen-nitrogen mixture leaving the nitrogen scrubbing column, the main component of which is hydrogen, and which is under only a little lower pressure of about 73 atmospheres; in this manner, the nitrogen is expanded to a partial pressure of about 18 atmospheres with the total pressure remaining substantially unchanged. This mixing step yields the amount of refrigeration required in a steady state operation for compensating for the heat exchange and insulation losses, so that it is possible to omit liquid pumps and expansion machines, while simultaneously avoiding compression considerably above the output pressure.

The synthesis gas leaves the plant, after having been warmed in heat exchangers 7, 4, and 3, through conduit 14. In case the hydrogen:nitrogen ratio in the warm synthesis gas does not yet exactly correspond to the required value, additional nitrogen can be added via conduit 15.

The sump product of the scrubbing column 10, consisting essentially of nitrogen, $CH_4$ and CO, is expanded, in valve 16, to the delivery pressure, warmed in heat exchangers 8, 6, and 5, and withdrawn via conduit 17.

Figure 2:
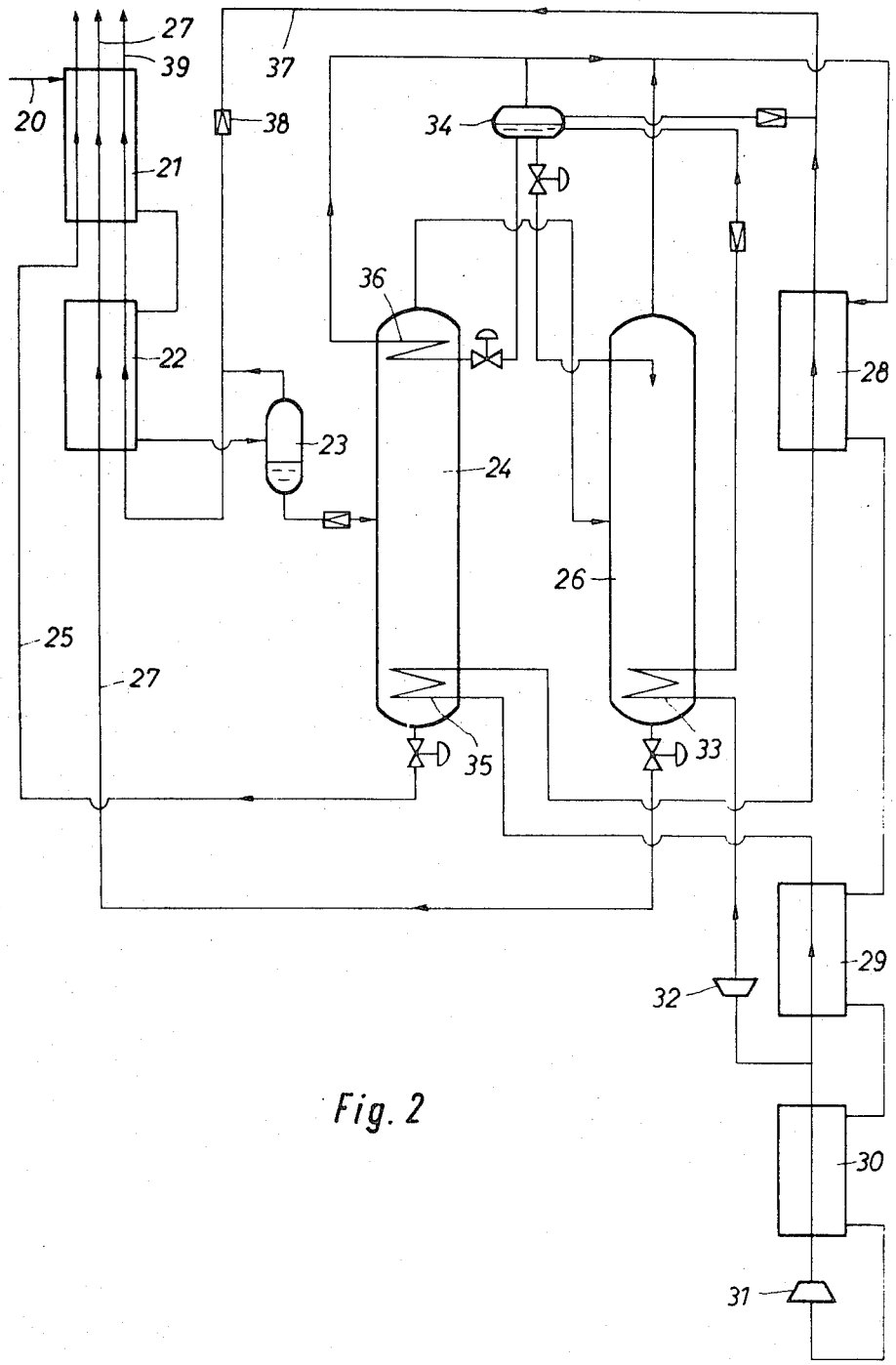
FIG. 2 is a schematic flowsheet illustrating another preferred embodiment as applied to the treatment of waste gas from an ammonia synthesis gas wherein nitrogen and hydrogen are separated therefrom and admixed in a similar manner to FIG. 1.

Referring now to FIG. 2, the waste gas from an ammonia synthesis plant is treated according to the invention. The gas to be fractionated, consisting of hydrogen, nitrogen, argon, and methane, is fed to the plant through conduit 20 at a pressure of 50–80 atm. It is cooled in the heat exchangers 21 and 22 countercurrently to fractionation products to such an extent that all components are condensed, with the exception of the hydrogen. The liquid is separated in separator 23, expanded into the column 24, and rectified therein. The methane which collects in the sump in the liquid phase is fed to the heat exchanger 21 via conduit 25; the head product, a mixture of nitrogen and argon, is separated in a further column 26 into gaseous nitrogen as the head product and liquid argon as the sump product, the latter being then warmed in heat exchangers 22 and 21 and then discharged via conduit 27.

The nitrogen from the head of column 26 is fed into the refrigeration cycle of the system, as follows: The nitrogen is warmed in heat exchangers 28, 29, and 30, compressed in compressor 31, and again cooled in heat exchanger 30. A portion of the nitrogen is now engine-expanded in the expansion machine 32, transfers heat in the coil 33 to the sump of the column 26, and is finally expanded into the liquid nitrogen phase separating tank 34. The residual nitrogen is cooled in heat exchanger 29, heats the sump of the column 24 in coil 35 (being liquefied during this procedure); is further cooled in heat exchanger 28, and is likewise expanded into the nitrogen phase separator 34. From the latter, one portion of liquid nitrogen is fed as scrubbing liquid to the column 26 and another portion is passed to and vaporized in coil 36 in order to cool the head of column 24. The resultant gaseous nitrogen from coil 36 is recycled to the compressor 31, together with both the gaseous nitrogen leaving container 34 and the head product of column 26, said recycling being conducted via the heat exchangers 28, 29, and 30.

It is now necessary to admix, to the hydrogen leaving the separator 23, nitrogen in the proportion required for the ammonia synthesis gas. For this purpose, an appropriate portion of the nitrogen compressed in compressor 31 and cooled in exchanger 30 is branched off, prior to being fed into the container 34, and added to the hydrogen via conduit 37 and mixing valve 38. In this manner, the nitrogen is expanded to its partial pressure, without any substantial change in the total pressure, and by the thus-produced cold, there is supplied a portion of the refrigeration required for the process. The synthesis gas is discharged from the plant via conduit 39.

Figure 3:
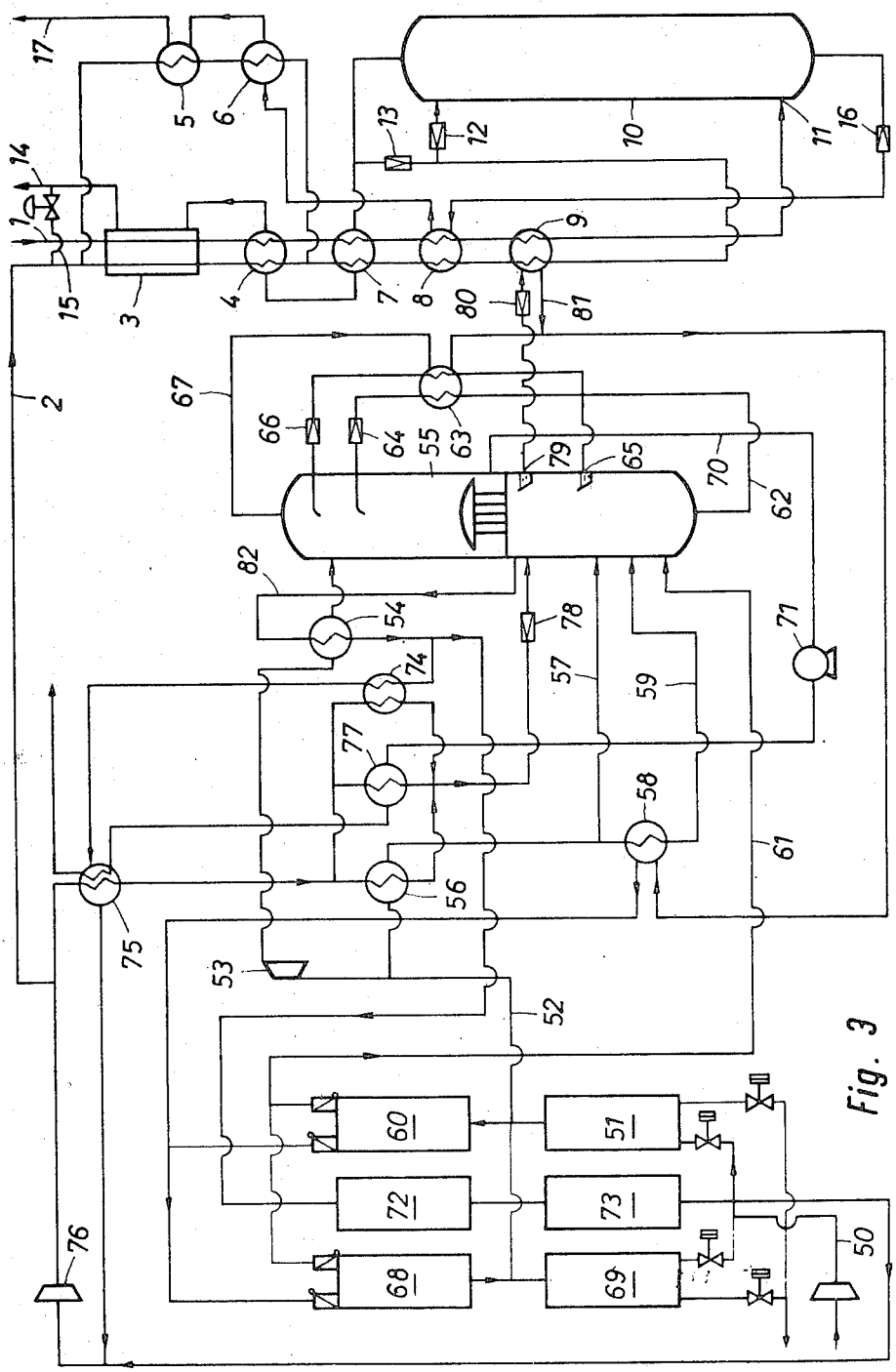
FIG. 3 is a schematic flowsheet showing an especially preferred embodiment of the invention wherein an ammonia synthesis plant is combined with an air separation plant in such a manner that the same turbocompressor can be used for both the cycle nitrogen of the air plant and the scrubbing nitrogen for the synthesis gas plant.

Referring now to FIG. 3, there is shown the combination of the liquid nitrogen scrubbing stage according to FIG. 1 with an air separation plant. Identical components bear identical reference numerals.

The raw hydrogen is produced by partial oxidation of a hydrocarbon at about 95 atmospheres. Accordingly, the oxygen required for this purpose must also be supplied at 95 atmospheres. To obtain this oxygen as well as the nitrogen required for the liquid nitrogen scrubbing step, 205,000 Nm.³/h. of air is compressed to 6 atmospheres, fed via conduit 50, in the illustrated switching cycle, to the flow path 51 of a conventional reversible heat exchanger or regenerator system, cooled therein countercurrently to fractionation products, and dried and freed of $CO_2$ during this procedure. A portion of the air from flow path 51 now passes through conduit 52 to the turbine 53, is expanded therein to about 1.5 atmospheres, and then fed, via heat exchanger 54, into the upper column of the air double rectification column 55.

An additional amount of air flows, from conduit 52, first through the heat exchanger 56 and is then fed, in part, directly via conduit 57 and, in part, after passing through the heat exchanger 58, through conduit 59, to the lower column of double column 55, said lower column operating at about 6 atm. The remaining air is cooled, in flow path 60 of the reversing exchanger system, approximately to liquefaction temperature, and is then passed through conduit 61 likewise into the lower column of the rectifier 55.

Oxygen-enriched liquid from the sump of the lower column is subcooled in heat exchanger 63, and then passed through expansion valve 64 into the upper column where it is separated into pure oxygen and impure nitrogen. The reflux liquid necessary for this purpose is withdrawn from the lower column at 65 and fed to the upper column via the heat exchanger 63 and the expansion valve 66. The impure nitrogen, 136,676 Nm.³/h., discharged from the head of the upper column through conduit 67, is warmed in heat exchangers 63 and 58 and then in the reversing exchanger system, in the illustrated switching cycle in flow paths 68 and 69, to ambient temperature. By this technique, the nitrogen vaporizes and entrains the water and carbon dioxide precipitated from the air in the preceding switching cycle.

The liquid oxygen produced in the sump of the upper column is withdrawn via conduit 70 and by means of pump 71 is brought to a pressure of 95 atm. In order to be able to warm this compressed oxygen, a nitrogen cycle is provided: 112,800 Nm.³/h. of gaseous nitrogen are withdrawn from the lower column through conduit 82, warmed in heat exchanger 54 against turbine-expanded air, and then divided. One portion is warmed in the flow paths 72 and 73 of the reversing exchanger plant, and the other portion is warmed in heat exchangers 74 and 75. Both partial streams are then combined and then compressed to about 80 atm. in compressor 76. 75,476 Nm.³/h. of compressed nitrogen is cooled in heat exchanger 75 against nitrogen from the lower column and against compressed oxygen, and then divided: The first partial stream passes through the heat exchanger 56; the second partial stream is cooled in heat exchanger 77 by compressed oxygen; and the third partial stream is cooled in heat exchanger 74 by the cycle nitrogen from the lower column. The three partial streams are combined and then expanded in valve 78 to the pressure of the lower column, and from valve 78, the nitrogen is passed into said lower column.

The residual portion of the nitrogen compressed by compressor 76, amounting to 37,324 Nm.³/h., is fed to the conduit 2 of the liquid nitrogen scrubbing plant and further treated therein, in the manner set forth in FIG. 1. The amount of raw hydrogen entering conduit 1 is 109,252 Nm.³/h.; and through conduit 14, 136,400 Nm.³/h. of synthesis gas is withdrawn, the pressure of the latter being lower than the incoming hydrogen pressure by substantially only that pressure drop resulting from the nitrogen scrubbing step. The residual gas is withdrawn from conduit 17 in an amount of 10,176 Nm.³/h. at a pressure of a little over 1 atm.

The refrigeration required for initiating the liquid nitrogen scrubbing step is passed to the heat exchanger 9 by withdrawing liquid nitrogen at 79 from the lower column of the double column 55, expanding same in valve 80 to the pressure of the upper column, and vaporizing same in the heat exchanger 9. The gaseous nitrogen is then combined, via conduit 81, with the nitrogen discharged from the head of the upper column via conduit 67.

Although this invention has been described primarily in connection with the production of ammonia synthesis gas, the benefits obtained by mixing two gaseous streams, as described, are generally applicable to other processes, for example to the production of $H_2$-CO mixtures (oxo-synthesis).

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the production of ammonia synthesis gas comprising the steps of cooling nitrogen and raw hydrogen in heat exchange with scrubbing column products; passing a portion of resultant cooled gaseous nitrogen into a scrubbing column where the gaseous nitrogen is liquefied due to a reduction to its partial pressure in the scrubbing column and the raw hydrogen in the column is scrubbed countercurrently with said liquid nitrogen; withdrawing a purified hydrogen gas from said scrubbing column, and admixing another portion of the cooled nitrogen to purified hydrogen gas leaving the column, in an amount required to establish a hydrogen:nitrogen ratio of 3:1; the improvement comprising feeding said raw hydrogen entering said column at a pressure within the range of 35 to 180 atm., and compressing all the nitrogen required for said resultant cooled gaseous nitrogen and admixed portion of cooled nitrogen in a single compressor to a single pressure, said single pressure being substantially the same as that of the raw hydrogen and sufficient to admix said first portion of cooled nitrogen with said hydrogen in said scrubbing column, and also sufficient to admix said another portion of said cooled nitrogen to said purified hydrogen, the said single pressure of said nitrogen being less than 10% higher than the resultant pressure of the resultant mixture having said 3:1 ratio, whereby said admixing of nitrogen into said scrubbed hydrogen results in sufficient refrigeration production to compensate for refrigeration losses of the process.

2. A process as defined by claim 1 wherein the scrubbing step is conducted at a pressure not higher than 250 atmospheres.

3. A process as defined by claim 1 wherein the scrubbing step is conducted at a pressure not higher than 180 atmospheres.

4. A process as defined by claim 1 further comprising the preliminary step of compressing said raw hydrogen to a pressure of about 45–180 atmospheres.

5. A process as defined by claim 1 wherein said nitrogen is withdrawn from an air separation plant, said air separation plant comprising a compressed nitrogen cycle wherein said compressed nitrogen is passed in indirect heat exchange relationship with compressed liquid oxygen withdrawn from a rectification column, and wherein the same compressor employed for compressing the cycle nitrogen is employed for compressing the nitrogen used in said scrubbing step.

6. A process as defined by claim 5 wherein said compressor is a turbocompressor.

7. A process as defined by claim 5 further comprising the step of withdrawing liquid nitrogen from the air separation plant and exchanging the refrigerant value therein against raw hydrogen during the start-up of the production of ammonia synthesis gas.

8. A process as defined by claim 1 wherein the pressure differential between the compressed cooled nitrogen and the purified hydrogen is 0.1 to 5 atmospheres.

References Cited
UNITED STATES PATENTS

| | | | |
|---|---|---|---|
| 3,187,485 | 6/1965 | Konz | 252—377 |
| 3,312,075 | 4/1967 | Becker | 62—23 |
| 3,315,476 | 4/1967 | Kortlandt | 62—23 |
| 3,401,531 | 9/1968 | Kessler | 62—20 |
| 3,513,660 | 5/1970 | Becker | 62—28 |

NORMAN YUDKOFF, Primary Examiner

A. F. PURCELL, Assistant Examiner

U.S. Cl. X.R.

62—11, 17, 20; 252—376; 423—235, 248